Oct. 6, 1942.  D. R. DAVIS  2,298,040
FLUID FOIL
Filed Aug. 21, 1939

INVENTOR.
David R. Davis
BY Russell M. Otis
ATTORNEY.

Patented Oct. 6, 1942

2,298,040

UNITED STATES PATENT OFFICE 2,298,040

FLUID FOIL

David R. Davis, Los Angeles, Calif., assignor to Manta Aircraft Corporation, Los Angeles, Calif., a corporation of California Application August 21, 1939, Serial No. 291,207

3 Claims. (Cl. 244—35)

This invention relates to foils adapted for passage through a fluid, and particularly to the plan form of such a foil. While the invention is applicable to a foil for use in any fluid medium, it has a particularly valuable application to the problems of design and construction of aircraft.

Because of the continual demand for higher speeds and better all-around performance of airplanes, the problem of improving aerodynamic efficiency is becoming increasingly important. It has long been recognized that a great gain in aerodynamic efficiency of an airplane would result from placing the airplane engines and other useful loads within the wing foil structure so as to produce a "clean" airplane offering much less resistance in its passage through the air.

In order to accomplish this it is necessary to devise a wing plan form in which these loads are not only housed within the wind, but at the same time are maintained in such a position relative to the center of lift of the wing that stability of the airplane may be maintained. The engines and other useful loads can be housed in the wing if the root chord of the wing is made large. Then, if the wing is made with a high taper ratio, tapering from the root of relatively great chord length to a tip of relatively small chord length, and if the wing tips are swept back so that the center of area of the wing, and the wing tips, are located behind a line normal to the line of flight and bisecting the root chord, the center of lift of the airplane can be brought back far enough to lie in the vicinity of the center of gravity of the ship and longitudinal balance can be secured.

All attempts to make practicable wings of this type, however, have failed because the tip portions of such wings have a tendency to stall at a very small angle of attack, which results in loss of aileron control and in "tip drop," causing violent lateral instability of the airplane, as well as a loss in efficiency of the entire wing. The loss of lateral control offers a very serious problem which must be overcome if large root chord, highly tapered, swept-back wings are to come into use; but all means heretofore devised to correct this defect have either been ineffective or have resulted in other and further losses in wing efficiency sufficient in magnitude to defeat the whole purpose of this type of wing.

It is an object of this invention, therefore, to provide a fluid foil comprising a highly tapered, swept-back wing which nevertheless has high aerodynamic efficiency and does not suffer from lateral instability.

Another object is to provide a fluid foil comprising a highly tapered, swept-back wing having leading edges which are contoured to induce an efficient flow pattern about the wing tips.

A further object is to provide a fluid foil with a plan form suitable for housing engines and other useful loads within the wing and which has high aerodynamic efficiency and good fore and aft and lateral stability.

These and other apparent objects are attained in a manner which will be clear from consideration of the following description taken in connection with the accompanying drawing, of which:

Figure 1:
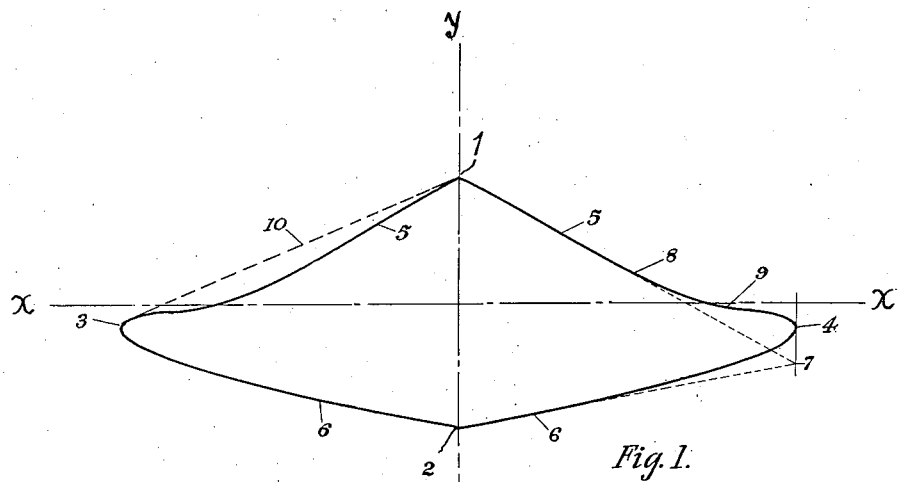
Fig. 1 shows the plan form of a fluid foil embodying my invention.

Referring to Fig. 1, my fluid foil will be seen to have a relatively great root chord 1—2, the leading end of the root chord being designated by the numeral 1 and the trailing end of the root chord being designated by the numeral 2. The longitudinal reference axis $y$—$y$ is located to coincide with the root chord 1—2, which is the normal line of flight, and the lateral reference axis $x$—$x$ is oriented normal to the axis $y$—$y$ and is located so as to bisect the root chord 1—2. The wing tips are designated by the numerals 3 and 4. The leading edge of the foil is designated by the numeral 5 and the trailing edge by the numeral 6. My invention primarily concerns the plan form of a foil; so the foil of my invention is shown only in plan, it being understood that the upper and lower surfaces of my foil are preferably cambered to provide a foil section of high aerodynamic efficiency, but the foil of my invention is not limited to any particular foil section.

It will be seen that my foil is highly tapered from the root to the tips, the length of the root chord 1—2 being great compared to the length of the chord of the tip portions or of the chord of the tip extended. A foil of this type is spoken of in the art as having a high taper ratio. The chord of the foil continuously decreases from root to tip; that is, there is no chord which is greater in length than another closer to the root. The taper of the inner half portion, that closest to the root chord 1—2, is such that if the leading and trailing edges were continued in straight lines, as indicated by the dotted lines, they would intersect in a point 7 considerably to the rear of the axis $x$—$x$. The chord at a location along the span midway between the root and tip is in the disclosed embodiment approximately onehalf of the root chord. Starting, however, at the point 8, the leading edge 5 departs in a forward direction from the line 1—7 more and more as it approaches the wing tip 4, and forms a definitely concave portion 9 in the outer half of the wing. The trailing edge 6 in the outer portion thereof also departs in a forward direction from the straight line 2—7 as it approaches the tip 4. When near the very end of the tip portion, the leading edge 5 and the trailing edge 6 are rounded sharply to join at the extreme tip end 4, which is located to the rear of the axis $x$—$x$. The net result is a wing which is highly tapered but which decreases its rate of taper as it approaches the tip, which has a leading edge that is concave in its outer half, and which has a tip lying to the rear of the axis $x$—$x$. The left half span of the foil is of course an inverted duplicate of the right half span of the foil, above-described.

By reason of this shape the center of area of the foil is made to fall to the rear of the axis $x$—$x$, which is essential in order to cause the center of lift of the airplane to fall far enough back to coincide approximately with the center of gravity of the airplane when the engines are located within the wing. Such a wing, in which the center of area falls to the rear of a line normal to the root chord and bisecting the root chord, is spoken of as a swept-back wing. It will be clear that by rearwardly inclining the leading edge 5, throughout a considerable extent of the wing, at a greater angle with respect to the lateral axis $x$—$x$ than the trailing edge 6 is directed forwardly with respect thereto, a swept-back wing can be obtained. In the foil of my invention, this condition exists over the inner portion of the wing, but the rate at which the leading edge is rearwardly inclined decreases beyond the point 8 as the wing tip is approached, the center of area, however, always being maintained back of the axis $x$—$x$.

The concavity in the outer half of the leading edge, at 9, produces an efficient flow pattern and stabilizes the flow of fluid over the tip portions of the foil, thereby making it possible for a foil to maintain a firm and steady grip on the air. Since the improvement experienced at the tips of a foil is progressively effective to the root of the foil, the foil of my invention not only maintains satisfactory flow about the wing tips, but improves the flow across the entire span of the foil. In contrast to my foil, the straight dotted line 10 has been added in Fig. 1 to indicate the shape of leading edge heretofore proposed for tapered foils of great root chord adapted to house engines of airplanes. A foil with a leading edge such as that illustrated by the line 10 suffers from an inefficient flow of air over it and stalls at its tip portions at small angles of attack, resulting in dangerous lateral instability and loss of control by ailerons which unfortunately are positioned in the most defective region of the foil. It will be evident that the plan form of my foil differs radically from that heretofore proposed, as illustrated in Fig. 1.

Figure 2:
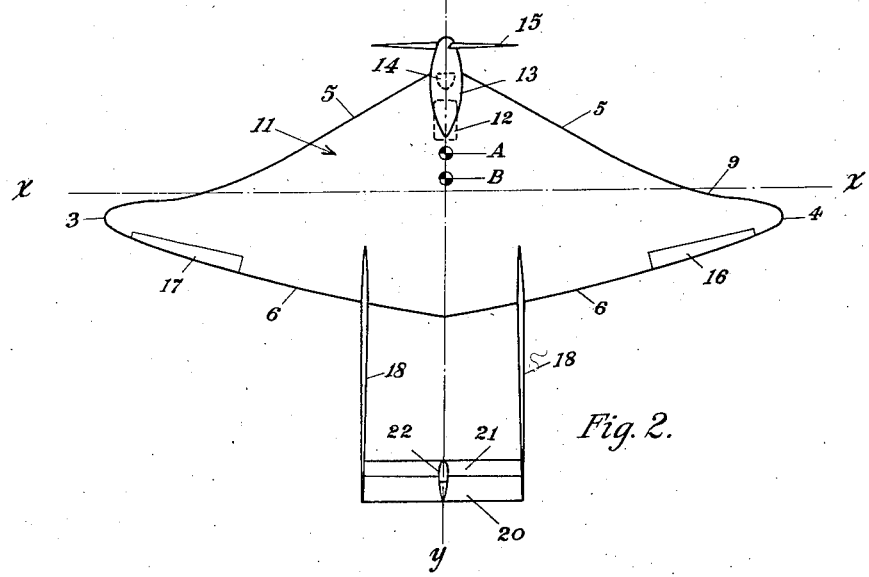
Fig. 2 is a plan view of an airplane employing the fluid foil of Fig. 1.

In Fig. 2, the foil 11 of my invention, having the shape of the foil of Fig. 1, is shown as a part of a complete airplane. The engine 12 is shown housed within the foil near the front end thereof. A nacelle 13 carries the pilot in a seat 14 and rotatably supports the propeller 15 in a position far enough forward to prevent interference between the propeller air flow and the wing. Ailerons 16 and 17 are located at the rear of the foil in the outer portion thereof behind the concave portion 9. An outrigger tail structure is secured to the foil 11, extending rearwardly therefrom, and comprises two outrigger booms 18 supporting tail surfaces 20, 21, and 22. The surface 21 is a fixed stabilizer surface, while the surface 20 is an adjustable elevator surface, and the surface 22 is a vertical fin, the rear portion of which comprises an adjustable rudder. It will be understood that a single fuselage may, if desired, be employed instead to support the tail group.

In such a structure the center of gravity of the airplane may be assumed to lie between points A and B. Because of the swept-back character of the foil 11, the center of lift of the airplane can also be made to lie between the points A and B, being shifted toward the point A by operation of the elevator 20 during a climb, and being shifted toward the point B by operation of the elevator 20 during a dive.

The foil of my invention thus is adapted, by the relatively long root chord and high taper ratio, to house the engines and other useful loads of an airplane within the foil itself, making an exceptionally "clean" airplane with low resistance to movement through the air and therefore adapted to high speeds and good all-around performance. Longitudinal balance is made possible by the swept-back character of the foil; and the special shape of the foil, primarily in the outer half postion of each semi-span, assures a satisfactory pattern of flow over the foil, stabilizes the flow of air over the ailerons 16 and 17, and assures lateral stability and control.

It will be understood that various changes and modifications may be made by those skilled in the art without departing from the spirit and scope of the invention as defined in the appended claims.

I claim as my invention:

1. A wing having a rounded tip and being highly tapered in plan, the outer portion of the wing having a lesser degree of taper than the inner portion thereof, the center of area of the wing lying behind a line normal to and bisecting the root chord, a trailing edge inclined forwardly from root to tip and a swept-back leading edge with a lesser degree of sweep-back along the outer half of the leading edge than along the inner half thereof.

2. A wing having a rounded tip and being highly tapered in plan, the outer half of the wing having a lesser degree of taper than the inner half, the center of area of the wing lying behind a line normal to and bisecting the root chord, a convex trailing edge inclined forwardly from root to tip, and a leading edge which is swept back from root to tip and which is concave along its outer half.

3. A wing having a rounded tip and being highly tapered in plan, the outer portion of the wing having a lesser degree of taper than the inner portion thereof, the tip and the center of area of the wing lying behind a line normal to and bisecting the root chord, a trailing edge inclined forwardly from root to tip and a swept-back leading edge with a lesser degree of sweep-back along the outer half of the leading edge than along the inner half thereof.

DAVID R. DAVIS.